G. S. CHILES.
TRUCK FRAME AND LEVER SUPPORT.
APPLICATION FILED OCT. 8, 1920.
1,411,954.
Patented Apr. 4, 1922.
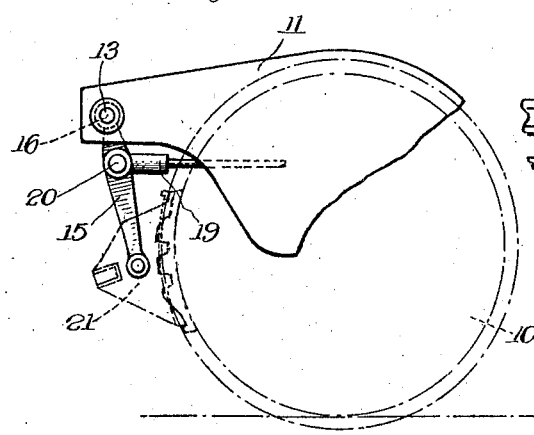
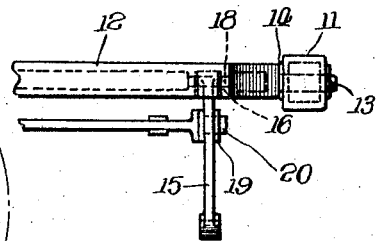
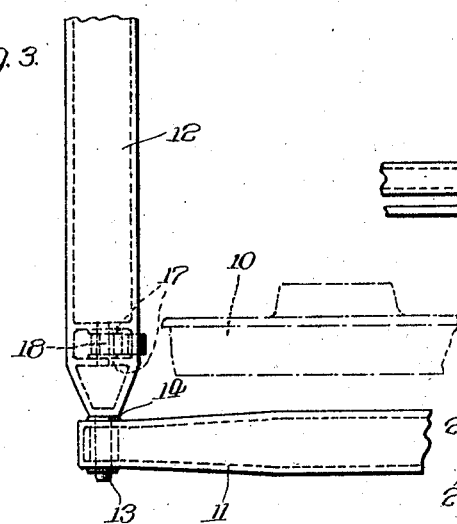
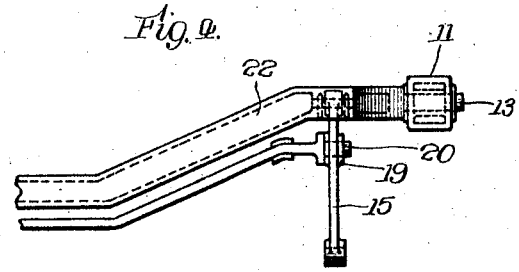
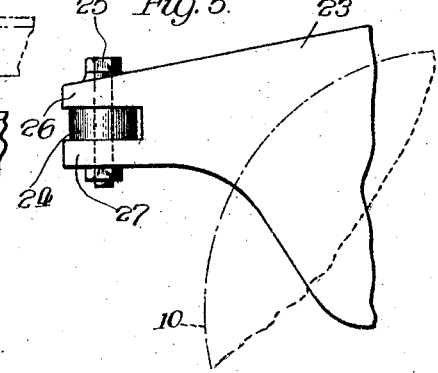
Inventor:
George S. Chiles,
Witness:

UNITED STATES PATENT OFFICE.

GEORGE S. CHILES, OF CHICAGO, ILLINOIS, ASSIGNOR TO AMERICAN STEEL FOUNDRIES, OF CHICAGO, ILLINOIS, A CORPORATION OF NEW JERSEY.

TRUCK FRAME AND LEVER SUPPORT.

1,411,954.  Specification of Letters Patent.  Patented Apr. 4, 1922.

Application filed October 8, 1920. Serial No. 415,509.

*To all whom it may concern:*

Be it known that I, GEORGE S. CHILES, a citizen of the United States, residing at Chicago, in the county of Cook and State of Illinois, have invented certain new and useful Improvements in Truck Frames and Lever Supports, of which the following is a specification.

This invention relates to a truck frame and lever support.

Two means of attaching the brake mechanism to truck frames are in use. In the first construction the ends of the associated side frames are connected by a rigid cross member, either formed integrally with the side frames or rigidly connected thereto by rivets or the like. In the second construction, the ends of the side frames are laterally inturned to support the brake hanger and also act as a brake lever fulcrum. Unless the frame in the first construction is tied together at more than one point, and in all cases of inturned frames, the brake action results in high stresses in the frame or frames, high end loads on the journal brasses and an uneven distribution of the vertical bearing pressure on the journal brasses.

One object of the invention is to flexibly connect the truck side frames in a simple and efficient manner to permit relative movements of said side frames and to overcome the undesirable features above mentioned.

Another object is to support brake mechanism on the means flexibly connecting the side frames in a simple manner adapted to meet all of the requirements under service conditions.

These and other objects are accomplished by means of the arrangements disclosed on the accompanying sheet of drawings, in which—

Figure 1 is a fragmentary side elevation of a railway car truck embodying my invention;

Figure 2 is a fragmentary end view of the same;

Figure 3 is a fragmentary top plan view of the same;

Figure 4 is a fragmentary end elevation of a modification of my invention; and,

Figure 5 is a fragmentary side elevation of a railway car truck embodying a further modification of the invention.

The various novel features of the invention will be apparent from the following description and drawings and will be particularly pointed out in the appended claims.

Referring first to Figures 1, 2 and 3 of the drawings, it will be noted that I have disclosed the invention in connection with a railway car truck supported on wheels 10, only one of which is shown, the truck including side frames 11, only one of which is shown, the ends of which side frames 11 are flexibly connected by a cross connecting member or beam 12 having at each end a trunnion 13 which fits loosely in the associated side frame 11. Each trunnion has a shouldered portion 14 normally engaging the inner side of the associated side frame. The connection in each case between the side frame member 11 and the cross beam 12 is sufficiently loose to permit one side frame to move relatively to the other in a plurality of directions, thereby providing a flexible structure which is responsive to the variable service conditions to which trucks are subjected.

The cross beam 12, which flexibly connects the two side frames, also acts as a lever fulcrum. As shown in the figures of the drawings, it acts as a dead lever fulcrum, the upper end of the associated lever 15 being pivotally connected at 16 to transverse flanged portions 17 on the beam 12 by means of a pin 18. The pull rod 19 is pivotally connected at 20 to an intermediate portion of the lever 15, and in this instance the lever acts as a hanger, to the lower end of which a brake head 21 may be pivotally connected. It is apparent that if the truck side frames were not connected at their ends by a cross beam 12, or its equivalent, a tremendous twisting force would be exerted upon the side frame when the brakes are applied, it being understood that the brake mechanism at the dead lever end would be supported upon a laterally inturned end of the side frame. The tendency of such force would be to cause the intermediate portion of each side frame to bulge outwardly, thereby displacing the proper position of the journal brasses with respect to the journals. However, by providing the cross connecting beam at the ends of the side frames, the tendency for the side frames to bulge outwardly is overcome.

In Figure 4 the arrangement is the same as that disclosed in Figures 1, 2 and 3, with the exception that the cross beam or dead lever fulcrum 22 is depressed intermediate its ends for the purpose of providing sufficient clearance for certain types of draft mechanism.

In Figure 5 a further modification is shown in which each end of the cross connecting member is pivotally connected to its associated side frame 23 by an eye portion 24 which receives a vertically extending pin 25, which also extends through aligned openings in ears 26 and 27 in the side frame and between which the eye portion 24 of the cross connecting member is located. This connection between the cross connecting member and side frames provides great flexibility between the oppositely arranged side frame members.

It is my intention to cover all modifications of the invention falling within the spirit and scope of the following claims.

I claim:

1. In a railway car truck, the combination of oppositely arranged side frames, means loosely connecting said side frames at the ends thereof to provide a flexible construction, and brake mechanism suspended therefrom.

2. In a railway car truck, the combination of oppositely arranged side frames, means flexibly connecting said side frames at the ends thereof to permit relative movement of said side frames without distortion, and brake mechanism suspended therefrom.

3. In a railway car truck, the combination of oppositely arranged side frames, means loosely connecting said side frames at the ends thereof, and a hanger means supported by said connecting means.

4. In a railway car truck, the combination of oppositely arranged side frames, and a brake hanger fulcrum loosely connecting said side frames.

Signed at Chicago, Illinois, this 5th day of October, 1920.

GEORGE S. CHILES.